United States Patent
Maloney

(10) Patent No.: US 9,610,658 B2
(45) Date of Patent: Apr. 4, 2017

(54) REEL FEED CLINCHING TACK PINS

(71) Applicant: Penn Engineering & Manufacturing Corp., Danboro, PA (US)

(72) Inventor: Michael Maloney, Doylestown, PA (US)

(*) Notice: Subject to any disclaimer, the term of this patent is extended or adjusted under 35 U.S.C. 154(b) by 45 days.

(21) Appl. No.: 14/681,406

(22) Filed: Apr. 8, 2015

(65) Prior Publication Data

US 2015/0282569 A1    Oct. 8, 2015

Related U.S. Application Data

(60) Provisional application No. 61/976,619, filed on Apr. 8, 2014.

(51) Int. Cl.

| | |
|---|---|
| *F16B 15/08* | (2006.01) |
| *B23P 15/00* | (2006.01) |
| *B23K 1/00* | (2006.01) |
| *B23K 20/10* | (2006.01) |
| *B23K 20/00* | (2006.01) |
| *B23P 19/00* | (2006.01) |
| *F16B 5/04* | (2006.01) |
| *F16B 27/00* | (2006.01) |

(52) U.S. Cl.
CPC ............ *B23P 15/00* (2013.01); *B23K 1/0008* (2013.01); *B23K 20/002* (2013.01); *B23K 20/10* (2013.01); *B23P 19/001* (2013.01); *F16B 5/04* (2013.01); *F16B 27/00* (2013.01); *Y10T 24/2767* (2015.01)

(58) Field of Classification Search
CPC ........ F16B 5/04; F16B 15/0015; F16B 15/08; F16B 27/00
USPC .................................................. 411/442–445
See application file for complete search history.

(56) References Cited

U.S. PATENT DOCUMENTS

| | | | | |
|---|---|---|---|---|
| 312,691 | A * | 2/1885 | Woodward et al. | ..... F16B 15/08 411/444 |
| 358,985 | A * | 3/1887 | Raymond, II | .......... F16B 15/08 411/444 |
| 2,329,440 | A * | 9/1943 | La Piace | ................. F16B 15/02 206/343 |
| 2,428,259 | A * | 9/1947 | Anstett | .................... F16B 15/08 411/443 |
| 2,867,807 | A * | 1/1959 | Anstett | ............... F16B 15/0015 206/340 |

(Continued)

FOREIGN PATENT DOCUMENTS

| | | |
|---|---|---|
| EP | 2 141 366 | 1/2010 |
| GB | 1 368 934 | 10/1974 |

*Primary Examiner* — Roberta Delisle
(74) *Attorney, Agent, or Firm* — Ryder, Lu, Mazzeo & Konieczny LLC; Joseph M. Konieczny, Sr.; Gregory J. Gore

(57) ABSTRACT

A clinch pin fastener comprises a lamination of layers bonded face-to-face. The individual layers can be formed by stamping or photo etching and can be bonded together by soldering, by using an adhesive or by ultrasonic bonding. The heads of the outermost layers may include a tab at the top which extends laterally at a 90-degree angle to the outermost layer. The fasteners are preferably constructed by bonding elongate strips to form a continuous string of fasteners joined side-to-side at integral, severable joints located between adjacent heads of the fasteners. The fasteners can be wound about a supply reel without a carrier and thereafter unwound from the reel as they are installed.

16 Claims, 3 Drawing Sheets

(56) References Cited

U.S. PATENT DOCUMENTS

| | | | | |
|---|---|---|---|---|
| 3,137,858 | A * | 6/1964 | Powers | F16B 15/08 206/344 |
| 3,373,646 | A * | 3/1968 | Ehlert | F16B 15/08 206/340 |
| 3,869,957 | A * | 3/1975 | Barth | F16B 15/0015 411/447 |
| 3,882,755 | A * | 5/1975 | Enstrom | F16B 15/04 411/442 |
| 4,040,325 | A | 8/1977 | Monacelli | |
| 4,220,070 | A * | 9/1980 | Anstett | F16B 15/08 411/444 |
| 4,909,690 | A | 3/1990 | Gapp et al. | |
| 5,441,373 | A * | 8/1995 | Kish | F16B 15/0092 411/258 |
| 5,971,688 | A * | 10/1999 | Anstett | B25C 1/00 411/442 |
| 7,044,350 | B2 * | 5/2006 | Kameyama | B25C 1/005 227/119 |
| 2003/0021655 | A1 * | 1/2003 | Correll | F16B 15/0015 411/473 |
| 2008/0089760 | A1 * | 4/2008 | Yao | F16B 15/08 411/477 |
| 2008/0131233 | A1 * | 6/2008 | Yao | F16B 15/08 411/456 |
| 2009/0191023 | A1 * | 7/2009 | Chang | F16B 15/08 411/443 |
| 2010/0239388 | A1 * | 9/2010 | Yao | F16B 15/08 411/477 |
| 2013/0022425 | A1 | 1/2013 | Ashton et al. | |
| 2013/0034408 | A1 | 2/2013 | Maloney | |

* cited by examiner

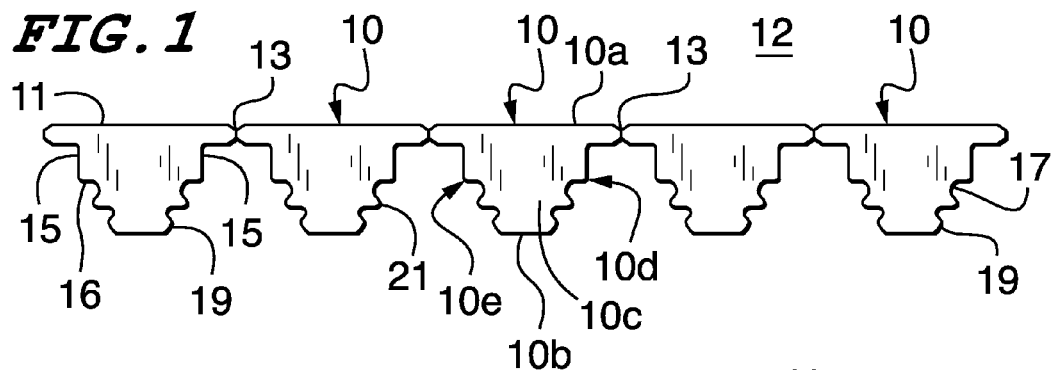
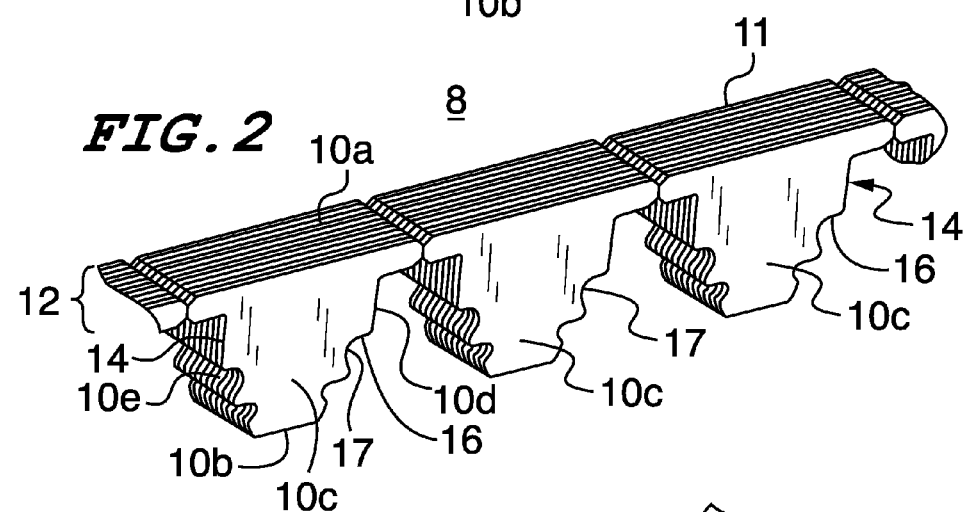
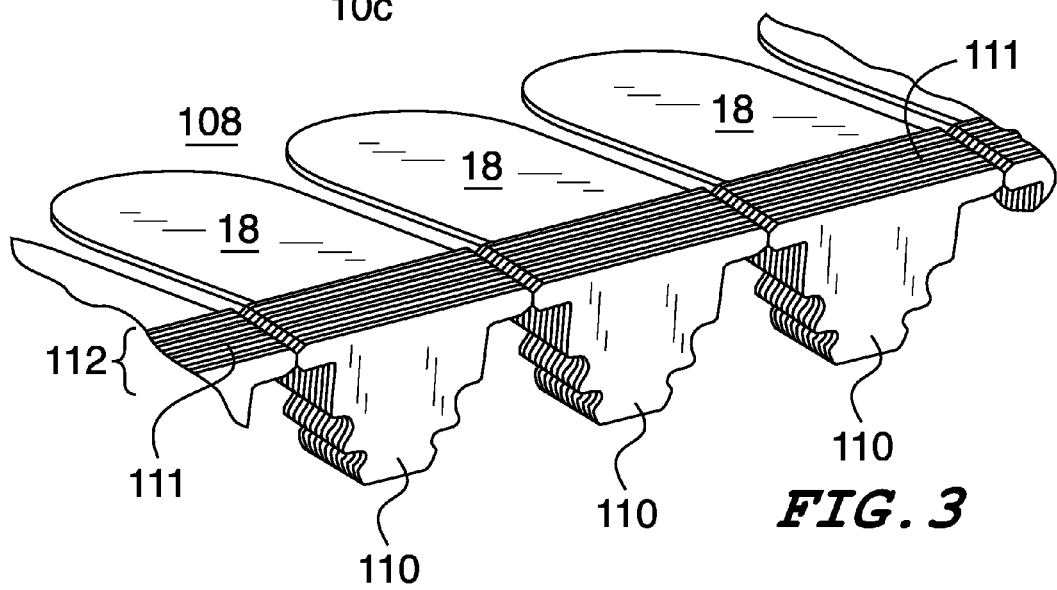

REEL FEED CLINCHING TACK PINS

RELATED APPLICATION

This non-provisional patent application claims priority to provisional patent application No. 61/976,619 filed Apr. 8, 2014 entitled "Reel Feed Clinching Tack Pins," the contents of which are incorporated herein by reference.

FIELD OF THE INVENTION

The present invention relates to miniature metallic pins applied to two panels to attach them face-to-face by clinching. More specifically, the invention relates to clinch pins of this type that can be fed from a reel of interconnected pins to an automated installation press.

BACKGROUND OF THE INVENTION

Clinch-type fasteners are known in the art for securing two panels together. Typically, a displacer on the shank of the pin deforms material on the bottom of the two panels and pushes the material into an undercut in the shank, thereby locking the pin to the bottom panel. At the same time, the underside of the head of the pin abuts the top panel and holds it against the bottom panel, thereby locking the two panels together.

Clinching tack pins having a miniature size are known in the prior art. Miniature tack pins are very useful but their very small size makes them very difficult to handle, i.e., load, orient, feed, deform, etc. As new tack pin designs get smaller and smaller, the associated handling problem has become even more challenging and in some cases commercially impossible. Therefore, it would be desirable to provide a miniature tack pin that can be easily commercially handled by an automated machine and is economical to produce.

SUMMARY OF THE INVENTION

The present invention solves the problem of handling very small tack pins by incorporating them into a string of temporarily-attached, severable pins that is flexible enough to be wound on a reel. The reeled pins can then be fed sequentially to the installation site. This invention is related to U.S. patent application Ser. No. 13/558,519 filed by the present applicant, which is incorporated by reference herein as though fully set forth. That application discloses a system by which a string of tack pins are attached head-to-toe. As a complete departure from that system, the present inventor provides a tack pin formed by stacking and bonding individual material pattern layers face-to-face. The layers are constructed to provide severable joints preferably of reduced dimension, between individual fasteners which are oriented side-to-side rather than head-to-toe. The joints are flexible enough so that the fasteners can be wound on a reel without the need for a carrier strip. This construction avoids need for and cost of a carrier strip and the additional step of disposing the carrier waste.

More specifically, the invention provides a metal fastener pin which comprises a lamination of longitudinal layers bonded face-to-face. Each layer comprises, from top to bottom, a head, a shoulder for displacing material of a host object, and an undercut for receiving displaced host material. The individual layers can be formed by stamping or photo etching. The layers can be bonded together by soldering, adhesion or by ultrasonic bonding. The heads of the outermost layers may include a tab or tabs at the top, which extend laterally at a 90-degree angle to the outermost layers. The fasteners are preferably formed in a continuous string of identical fasteners joined side-to-side at integral, severable joints located between adjacent heads of the fasteners. The fasteners can be wound about a supply reel without a carrier and thereafter unwound from the reel as they are installed.

BRIEF DESCRIPTION OF THE DRAWINGS

FIG. 1 is a side elevation of a single layer of a plurality of connected tack pins in accordance with a preferred embodiment of the invention;

FIG. 2 is a left front perspective of the full, multi-layer construction of the connected tack pins of FIG. 1;

FIG. 3 is a left front perspective of the full, multi-layer construction of a plurality of connected tack pins in accordance with another preferred embodiment of the invention;

DESCRIPTION OF THE PREFERRED EMBODIMENT

Figure 4:
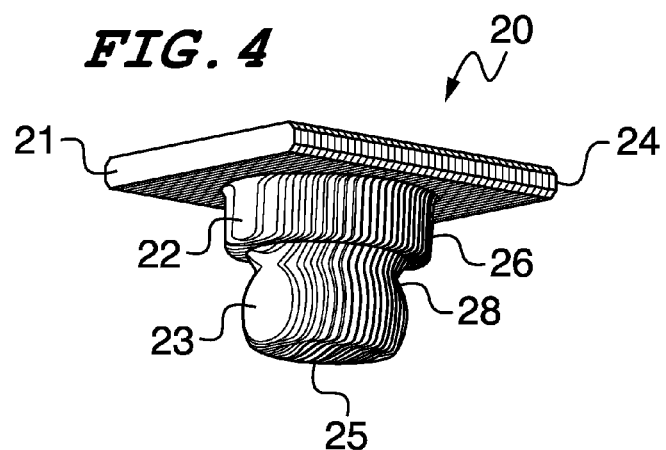
FIG. 4 is a bottom perspective of the full, multi-layer construction of a tack pin in accordance with a further embodiment of the invention.

For the purpose of illustrating the invention, numerous preferred embodiments are shown in the accompanying drawings. However, it should be understood by those of ordinary skill in the art that the invention is not limited to the precise arrangements and instrumentalities shown therein and described below. Throughout the specification, like reference numerals are used to designate like elements. Numerous changes and modifications within the spirit and scope of the invention will become apparent to those skilled in the art from this detailed description. Unless otherwise defined, all terms used herein in their various grammatical forms have the same meaning as commonly understood by one of ordinary skill in the art to which this invention belongs.

Figure 7:
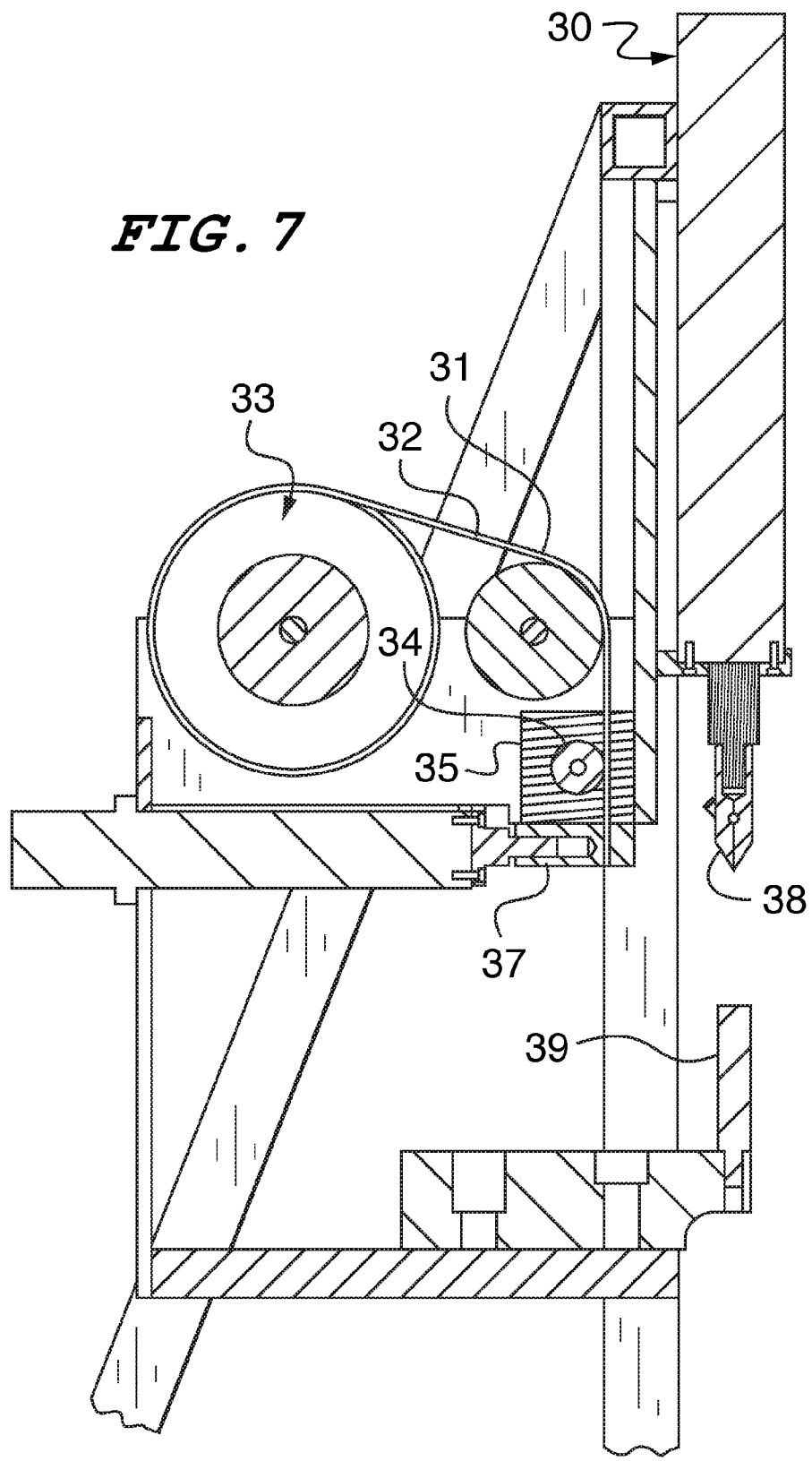

A string of fasteners in accordance with a preferred embodiment of the invention is illustrated in FIGS. 1-2 and is designated generally by reference numeral 8. The string 8 comprises a plurality of similarly constructed tack pins 10, which are interconnected with one another, and then preferably wound onto a spool for storage and then use in a manufacturing machine such as shown in FIG. 7. Each tack pin 10 generally comprises a head portion and an irregularly-shaped shank portion. In this embodiment, the pins have planar top 10a, bottom 10b, front 10c, and back (not shown) 10d surfaces, and irregularly-shaped, opposed side surfaces 10e, 10f having the shape shown in FIG. 2 and the profile shown in FIG. 1. Referring to both drawings, the head 11 has a generally-planar shape and a rectangular cross-section taken along a plane orthogonal to the lengthwise axis of the shank. As best seen in FIG. 1, the side edges of the head are rounded.

With reference to FIG. 1, the fasteners 10 have a length extending horizontally and a height extending vertically.

With reference to FIG. 2, the fasteners have a width extending from the front face 10c to the back face 10d.

The head 11 is integrally formed with the shank, which extends from the bottom surface of the head 11 with reference to the orientation shown in FIGS. 1 and 2. The upper portion of the shank forms a shoulder 14 having axially-extending side surfaces 15 and a transverse-extending bottom surfaces 16, which, as described below, function as a material displacer. An undercut 17 is formed adjacent to and below the bottom surface 16. An interference hole sizing feature 40 is formed adjacent to and below the undercut 17. The sizing feature 40 includes a broaching portion 21 and a tapered tip 19. The sizing feature 40 functions similarly to the sizing feature illustrated and described in U.S. patent application Ser. No. 13/558,519. The sizing feature 40 enlarges the installation hole to the preferred diameter for the displacer. The sizing feature 40 effectively centers the tack pin and enlarges the installation hole so that all of the displaced material is available to fill the undercut 17 of the tack pin 10, thereby eliminating the inefficiency of filling clearance space around the fastener as is necessary for fasteners that do not have an interference hole sizing feature.

In contrast with prior art fasteners that are cast or forged from a unitary body of material, the tack pin 10 is formed from a plurality of discrete, thin, planar material pattern layers such as shown in FIG. 1, which are stacked and adhered to one another to form the three-dimensional tack pins shown in FIG. 2. FIG. 1 shows a strip 12 of individual material pattern layers of the laminated clinch pin fastener of FIG. 2. The strip 12 comprises an elongate, continuous strip of material, such as deformable metal, that has a repeating pattern. In this preferred embodiment, the pattern has the size and shape of a lengthwise cross-section of the tack pin 10. The pattern repeats at a weak, preferably frangible, joint 13 that interconnects adjacent material pattern layers. In this preferred embodiment, the joints 13 are located between adjacent heads 11 of the fasteners. The string 8 of tack pins 10 comprises a plurality of strips 12 of material pattern layers 12 adhered to one another to form discrete tack pins 10, which are interconnected at the frangible joints 13. The strips 12 of material pattern layers are preferably composed of metal and can be made by any suitable manufacturing process including stamping or photo etching.

FIG. 2 shows a plurality of strips 12 bonded together front face 10a to back face 10b of an adjacent strip 12 to form a string 8 of fasteners 10. The strips 12 of material pattern layers 12 can be bonded together by any suitable manufacturing process including soldering, ultrasonic bonding or by using an adhesive.

FIG. 3 depicts a tack pin 110 in accordance with another preferred embodiment of the invention. In this embodiment, the tack pin 110 has a construction similar to the fastener 10 described above; however, in this embodiment, the tack pin 110 includes a tab 18 fixed to and extending from the top of each head 111. With reference to the orientation shown in FIG. 3, the tab 18 is formed on only the outermost strip of material pattern layer on the back side of the strips 112. Although only one tab per fastener is shown for convenience of illustration, it should be understood and appreciated that a second tab on the front outer layer could be added so that each fastener includes two opposite facing tabs. The tabs 18 extend outwardly at an angle of approximately 90 degrees from the longitudinal axis of the fastener. The tabs may serve any useful purpose including applying a residual clamp load between objects joined by the fastener.

A tack pin 20 in accordance with another preferred embodiment of the invention is shown in FIG. 4. In this embodiment, the tack pin 20 has a construction similar to the tack pin 10 described above; however, in this embodiment, the material layer patterns do not have the same size and/or same profile. As a result, the tack pin does not have a uniform width-wise extending cross section. By using differently-sized and shaped material layer patterns such as 21, 22, 23, tack pins of non-uniform shapes, for example the rounded shape shown in this FIG. 4, can be created. In this embodiment, the shank portion of the tack pin 20 has a transverse cross-section that approximates a circle while the head portion still has a generally-square transverse cross-section.

Figure 5:
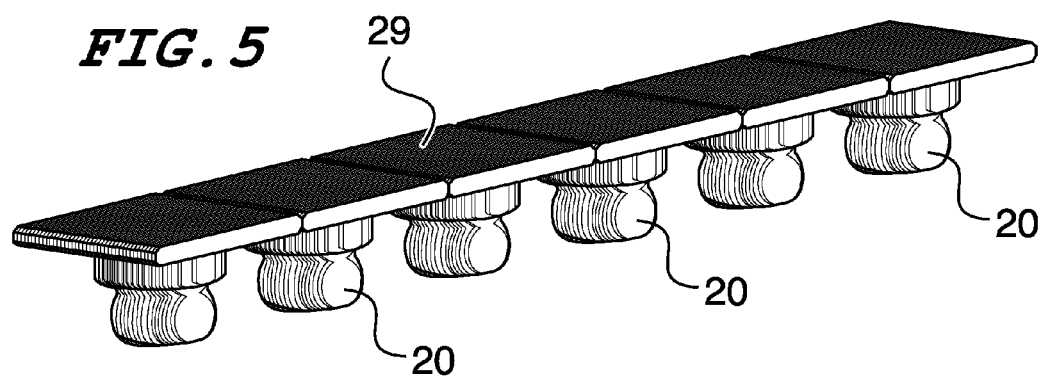
FIG. 5 is a top perspective of a plurality of connected fasteners shown in FIG. 4.

In this embodiment, individual fastener layers 21, 22, and 23 have differing dimensions and shapes. When laminated together, such layers provide the necessary features of a tack pin having a head 24, a shoulder 26 that functions as a displacer, and an undercut 28 for receiving displaced host material. This construction can also form a variety of either convex or concave features as shown by the cavity 25 in the end of the tack pin. FIG. 5 depicts a string of the tack pins shown in FIG. 4 attached side-to-side at frangible joints 29 in a manner similar to the strings shown in FIGS. 2 and 3.

Figure 6:
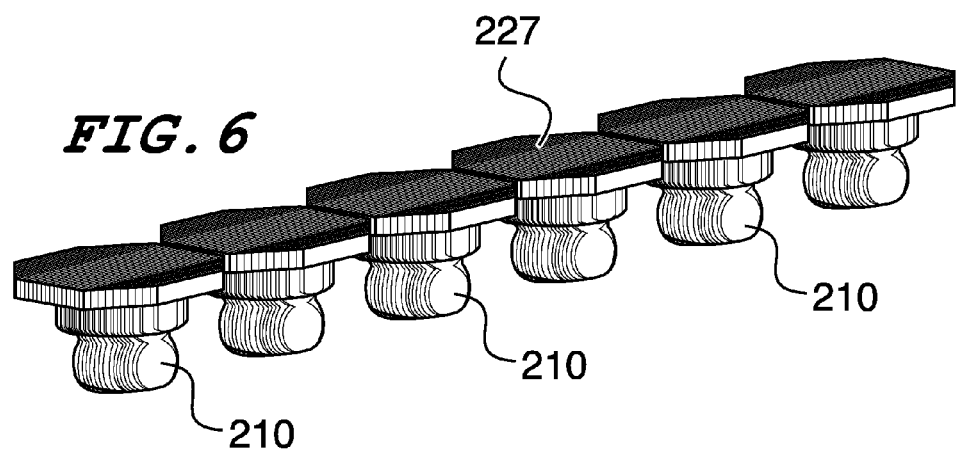
FIG. 6 is a top perspective of the connected string of fasteners shown in FIG. 5 after the head has been reshaped by stamping; and, FIG. 7 is a side elevation of an installation press useful for handling and installing fasteners in accordance with the various embodiments of the invention.

A string of tack pins in accordance with another preferred embodiment of the invention is shown in FIG. 6. In this embodiment, the tack pins 210 have a construction similar to the tack pin 20 described in FIGS. 4 and 5; however, in this embodiment, the tack pin has undergone a secondary stamping operation in which the head 227 has been reshaped from rectangular to hexagonal. It should be appreciated that the head 227 could be reshaped into a wide variety of additional shapes.

The strings of tack pins described above and illustrated in Figures provide sufficient flexibility so that they may be wound about a supply reel without the need for a carrier strip. The strings can then be unwound at the installation site as each fastener is used as shown in FIG. 7. This avoids the need for hand manipulation and loading of individual fasteners, which can be very difficult when the fasteners are very small as is the case with miniature tack pins having a width in the range of 1.0 mm.

Referring now to FIG. 7, a suitable installation press for the tack pins of the invention is schematically illustrated. The tack pin string 32 is unwound from a storage reel 33 and fed into the installation site. A punch preferably includes a vacuum head 38, which is moved toward an anvil 39 by an actuation cylinder 30. The string passes over an idler reel 31, indexed into position against a sheer block 37 by a feed sprocket 34, which is supported by a plate 35. The sheer block severs individual tack pins from the string one by one and transports them to the region just below the punch head where they are picked up by the punch vacuum. The pins are then forcibly installed by the press into objects to be fastened (not shown) located between the punch 38 and the anvil 39.

The embodiments described above satisfy the object of the invention. Miniature tack pins of various shapes may be produced economically and can be installed in an automated process by which individual fasteners are delivered to an installation site from a supply reel in a string without a carrier strip.

The foregoing should be considered as illustrative only of a limited number of embodiments utilizing the principles of the invention. Further, since numerous modifications and changes will readily occur to those skilled in the art, it is not desired to limit the invention to the exact construction and operation shown and described, and accordingly, all suitable modifications and equivalents may be resorted to, all falling within the scope of the invention which should be determined only by the following claims and their legal equivalents.

What is claimed is:

1. A clinch pin fastener for joining two objects together, comprising:
    a discrete tack pin consisting of a lamination of a plurality of material pattern layers bonded face-to-face, each layer comprising from top to bottom, a head, a shoulder for displacing material of a host object, and an undercut for receiving displaced host material.

2. The fastener of claim 1 wherein each of said layers is formed by stamping.

3. The fastener of claim 1 wherein each of said layers is formed by photo etching.

4. The fastener of claim 1 wherein said layers are ultrasonically bonded together.

5. The fastener of claim 1 wherein said layers are bonded together by soldering.

6. The fastener of claim 1 wherein said layers are bonded together by an adhesive.

7. The fastener of claim 1 wherein the head portion of an outermost layer includes a tab at the top which extends laterally at a 90-degree angle to said outermost layer.

8. The fastener of claim 1 having a rectangular transverse cross-section at all longitudinal points.

9. The fastener of claim 1 wherein each layer is identical.

10. The fastener of claim 1 wherein the layers are not identical.

11. The fastener of claim 1 further described in that a transverse cross-section approximates a circle.

12. The fastener of claim 1 which is composed of metal.

13. A string of clinch pin fasteners, comprising:
    a plurality of clinch fasteners interconnected laterally side-by-side by integral severable joints located between adjacent heads of the fasteners.

14. The string of fasteners of claim 13 wherein the fasteners are the fasteners of claim 1.

15. The string of fasteners of claim 14 comprising a plurality of elongate layered strips.

16. The string of fasteners of claim 15 wherein the string of fasteners is wound about a supply reel without a supporting carrier.

* * * * *